United States Patent Office 3,131,192
Patented Apr. 28, 1964

3,131,192
RAUNESCINE GROUP ALKALOIDS AND
THEIR OBTENTION
Johannes Mueller, Arlesheim, Switzerland, assignor to
Ciba Corporation, a corporation of Delaware
No Drawing. Filed Apr. 11, 1958, Ser. No. 727,766
Claims priority, application Switzerland Apr. 15, 1957
6 Claims. (Cl. 260—287)

The weakly basic ($p_{Ka}$ ~6–7.5) alkaloids obtainable from Rauwolfia plants can be divided into four main groups:

(a) Ajmalicine group

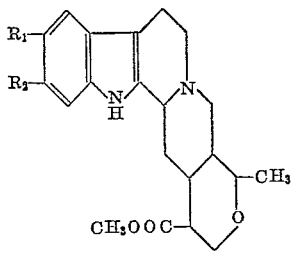

(1)

in which $R_1$ and $R_2$ each represent a hydrogen atom or a methoxy group. The most important member of this group is ajmalicine (Formula I, $R_1$ and $R_2$=H). Further alkaloids of this class are aricine (Formula I, $R_1$=OCH$_3$, $R_2$=H). Reserpinine (Formula I, $R_1$=H, $R_2$=OCH$_3$) and reserpiline (Formula I, $R_1$ and $R_2$= OCH$_3$). The alkaloids of the ajmalicine group possess no sedative or hypotensive action.

(b) Reserpine group

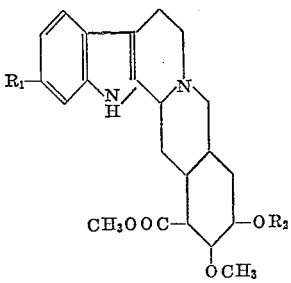

(II)

in which $R_1$ represents a hydrogen atom or a methoxy group, and $R_2$ represents a 3,4,5-trimethoxybenzoyl or 3,4,5-trimethoxycinnamoyl group. In addition to the most important member of this group, namely reserpine (Formula II, $R_1$=OCH$_3$, $R_2$=3,4,5-trimethoxybenzoyl), there may be mentioned the alkaloids deserpidine (Formula II, $R_1$=H, $R_2$=3,4,5-trimethoxybenzoyl) and rescinnamine (Formula II, $R_1$=OCH$_3$, $R_2$=3,4,5-trimethoxycinnamoyl). The alkaloids of this group possess a sedative and hypotensive action.

(c) Raunescine group

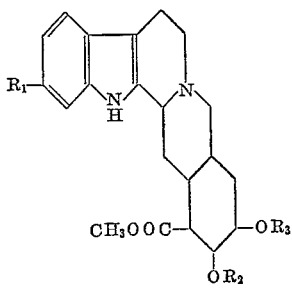

(III)

in which $R_1$ represents a hydrogen atom or a methoxy group, and one of the radicals $R_2$ and $R_3$ represents a hydrogen atom and the other represents the 3,4,5-trimethoxybenzoyl group. The most important members of this group are raunescine (Formula III, $R_1$=H, $R_2$=H, $R_3$=3,4,5-trimethoxybenzoyl) and pseudoreserpine (Formula III, $R_1$=OCH$_3$, $R_2$=H, $R_3$=3,4,5-trimethoxybenzoyl). These alkaloids possess a sedative action. There may also be mentioned isoraunescine (Formula III, $R_1$=H, $R_2$=3,4,5-trimethoxybenzoyl, $R_3$=H).

(d) Yohimbine group

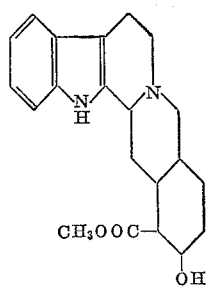

(IV)

The best known alkaloid of this group is yohimbine of the above formula. Stereoisomers thereof are corynanthine, isorauhimbine, $\psi$-yohimbine, $\alpha$-yohimbine, $\beta$-yohimbine and 3-epi-$\alpha$-yohimbine. The alkaloids of the yohimbine group possess no sedative or hypotensive action.

Accordingly only the alkaloids of the reserpine and raunescine groups are of interest with respect to sedative action. The former alkaloids are obtainable in good yield by known simple methods. There is however no method known whereby the alkaloids of the raunescine group can be obtained in good yield and especially in a manner which is simple and technically easy to carry out. Thus, N. Hosansky et al., Journal of the American Pharmaceutical Association, vol. 44, page 639 (1955), start from extracts of Rauwolfia canescens, which have been partially freed from the alkaloids of the reserpine group, especially reserpine and deserpidine, dissolve the residual material in acetic acid, extract the acetic acid solution with ether, and render alkaline the aqueous acid solution separated from the ether. They then extract the alkaline solution with ether and subsequently with chloroform. The chloroform extract is then subjected to chromatography. As the material at this stage of the process contains, in addition to the alkaloids of the raunescine group, considerable quantities of reserpine, deserpidine and other alkaloids, it is necessary in order to obtain pure alkaloids of the raunescine group to adjust the elution mixtures vary carefully relatively to one another. Moreover, a large number of fractions is necessary. Therefore, this process is very time-consuming and difficult to carry out industrially, quite apart from the large number of stages which precede the chromatography.

The present invention provides a process for isolating raunescine, isoraunescine and pseudoreserpine in a simple manner and in a pure form from mixtures of weakly basic alkaloids of Rauwolfia plants. Owing to the highly favorable separating action of the new process it has been possible to obtain, besides these known alkaloids of the raunescine group, a new alkaloid of this group, which has the structural formula:

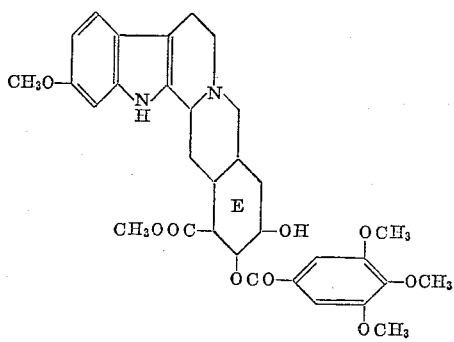

This new alkaloid stands in the same relationship to pseudoreserpine as isoraunescine does to raunescine and might therefore be called isopseudoreserpine. In order to avoid any confusion with an isomer in 3-position, it is called here raugustine. Like the other alkaloids of the raunescine group it contains in the ring E three easily exchangeable functional groups, so that it can be used as an intermediate product for the manufacture of pharmacologically active compounds. Thus, raugustine can be converted in a manner known per se into its esters with carboxylic or sulfonic acids, e.g. of the aliphatic, aromatic or heterocyclic series, which exhibit pharmacological activity. From raugustine with acetic anhydride in pyridine there is obtained 18-O-acetyl-raugustine.

Raugustine can be converted in a simple manner into the sedatively active pseudoreserpine or 17-acetyl-pseudoreserpine. Thus raugustine is added to a mixture of benzene, anhydrous pyridine chloride and methanol, and dihydropyrane is added. The mixture is stirred for several days with the exclusion of moisture at room temperature, is then diluted with benzene and extracted with dilute sodium hydrogen carbonate solution and several times with water. The dry benzene solution is evaporated and the residue boiled under reflux for two hours in an anhydrous mixture of methanol and sodium methylate. The mixture is diluted with water, concentrated to ⅓ of its volume, rendered acid to Congo red with aqueous hydrochloric acid and extracted twice with ether. The aqueous phase is rendered basic with aqueous ammonia and extracted several times with chloroform. The chloroform extract is dried, evaporated and allowed to stand overnight with acetic acid anhydride in pyridine. Water is added and the mixture is allowed to stand for 3 days in a nitrogen atmosphere and with the exclusion of light, is rendered alkaline with aqueous ammonia and extracted with chloroform. The 17-acetyl-pseudoreserpic acid methyl ester obtained after evaporating the chloroform solution is converted by esterification with trimethoxybenzoyl chloride in pyridine into 17-acetyl-pseudoreserpine which, after being recrystallized from dilute methanol and then from dilute acetone, melts at 150–154° C. in the form of lamellae.

Raugustine melts as hydrate unsharply at 160–170° C. and exhibits in the infra-red spectrum (in chloroform) pronounced bands at 2.88μ; 3.43μ; 5.87μ (wide band); 6.14μ; 6.28μ; 6.68μ; 6.87μ; 7.10μ; 7.52μ; 8.89μ and 10.04μ (wide band). It has the optical rotation $[\alpha]_D^{24} = -50°$ C. (c.=0.609 in chloroform) and in the ultraviolet spectrum it exhibits maxima at $\lambda=217$ m$\mu$ ($\epsilon=54,600$), $\lambda=268$ m$\mu$ ($\epsilon=15,400$) and $\lambda=291$ m$\mu$ ($\epsilon=9300$) and a pronounced minimum at 246 m$\mu$ ($\epsilon=9000$). Raugustine is soluble in chloroform, ethylene chloride, ethyl acetate, warm ethanol, methanol, acetone and benzene, sparingly soluble or insoluble in ether, petroleum ether and water. It can be crystallized, for example, from methanol or a mixture of methanol and water.

Raugustine forms salts with acids for example, those of hydrohalic acids, sulfuric acid, nitric acid, perchloric acid, phosphoric acid, formic acid, acetic acid, propionic acid, lactic acid, oxalic acid, succinic acid, malic acid, tartaric acid, citric acid, ascorbic acid, methane sulfonic acid, ethane sulfonic acid, hydroxyethane sulfonic acid, benzoic acid, salicylic acid, para-aminosalicylic acid or toluene sulfonic acid.

In the new process of this invention for obtaining alkaloids of the raunescine group an aqueous solution of a weak acid containing alkaloids of the raunescine group in admixture with other weakly basic alkaloids from Rauwolfia plants is extracted with benzene or an organic solvent having similar extraction properties with respect to weakly basic ester alkaloids in order to remove the alkaloids of the reserpine group and the greater part of the alkaloids of the ajmalicine group, from the acid aqueous solution the alkaloids of the raunescine group are obtained by extraction with ethylene chloride or an organic solvent having similar extraction properties with respect to weakly basic ester alkaloids, and, if desired, the pure alkaloids are isolated by adsorption, elution and crystallization from the mixture of alkaloids obtained from the latter extraction.

The solution used as starting material is advantageously an aqueous solution of a weak aliphatic carboxylic acid of low molecular weight, especially acetic acid, or propionic acid, tartaric acid, or citric acid, or a weak inorganic acid, such as phosphoric acid. The solution may contain the whole of the alkaloids of a Rauwolfia plant, for example, *Rauwolfia canescens* (also known as *Rauwolfia tetraphylla, heterophylla, hirsuta* or *tomentosa*), *Rauwolfia mattfeldiana* Mgf., *Rauwolfia grandiflora* Mart. (also known as *Rauwolfia affinis* Muell.-Arg.), or *Rauwolfia ligustrina* R. and S. (also known as *Rauwolfia ternifolia, parvifolia, alphonsiana* or *indecora* Woodson, see Rau, Annals of the Missouri Botanical Garden, vol. 43, page 299 [1956]), or only the weakly basic alkaloids of such plant. They can be obtained by a method in itself known, for example, by extraction from root materials with an alcohol, such as methanol, and treatment of the extracted material, which may also contain a small amount of the alcohol used, with the acid aqueous solution. Advantageously the acid alkaloid-containing solution is defatted, for example, by treatment with a lipoid solvent immiscible with water, such as hexane, before it is subjected to extraction with benzene or an organic solvent having similar extraction properties with respect to weakly basic ester alkaloids.

Organic solvents having similar extraction properties to benzene with respect to weakly basic ester alkaloids, are, for example, 1,1,1-trichlorethane and carbon tetrachloride. An organic solvent that corresponds to ethylene chloride in its extraction properties with respect to weakly basic ester alkaloids is, for example, 1,2-dichloro-1-ethoxy-ethane.

The adsorption and elution in the process of this invention are advantageously carried out as chromatography, preferably over aluminum oxide or fuller's earth. As eluting agents there may be used, for example, a mixture of benzene and acetone or a mixture of carbon tetrachloride and chloroform. It is however, preferable to use mixtures of benzene and a halogenated aliphatic hydrocarbon, such as chloroform or methylene chloride, and in order to ensure a good selectively in the elution there are advantageously used mixtures having an increasing content of the halogenated aliphatic hydrocarbon. From the fractions so obtained the alkaloids of the raunescine group are obtained in a pure form by crystallization, for example, from an organic or aqueous-organic solvent, for example, a mixture of ethanol and water, methanol and water, acetone and water, ethanol, methanol, acetone or a mixture of benzene and methylene chloride. In the first fractions obtained with eluting agents rich in benzene there is also frequently obtained a small amount of reserpiline, which is an alkaloid of the ajmalicine group.

From the acid solutions which remain behind in the process of this invention the alkaloids of the yohimbine group may be obtained, for example, by extraction with chloroform or an organic solvent having similar extraction properties, and then the strongly basic alkaloids and those of medium strength can be obtained in known manner, for example, by treatment with alkali and extraction of the bases.

Depending on the procedure used the new alkaloid raugustine is obtained by the process of this invention in the form of its base or a salt thereof. The base may be converted into a salt by treatment with an organic or inorganic acid such as a hydrohalic acid, sulfuric acid, a phosphoric acid, nitric acid, methane sulfonic acid, oxyethane sulfonic acid, toluene sulfonic acid, acetic acid, propionic acid, oxalic acid, succinic acid, ascorbic acid, tartaric acid, citric acid, salicylic acid or benzoic acid. Raugustine can be obtained in free form from its salts in the usual manner.

The invention also includes any modification of the process in which there is used as starting material an intermediate product obtainable at any stage of the process, and the remaining process steps are carried out, or in which the process is interrupted at any stage.

The following examples illustrate the invention:

Example 1

3.3 liters of an acetic acid (10% strength) extract solution of the total alkaloids of *Rauwolfia ligustrina* R. and S. (also known as *R. ternifolia, parvifolia, alfonsiana* or *indecora* Woodson, see Rau, Annals of the Missouri Botanical Garden, Vol. 43, page 299 [1956]), are extracted first with 2.5 liters of hexane, then twice with 1.5 liters of a mixture of hexane and ether (1:1) on each occasion, and then in succession once with 2 liters and two or three times with 1.5 liters of benzene, the mixtures being thoroughly stirred or shaken during the extractions. The resin which is thus deposited on the walls of the vessels is dissolved in about 20 ml. of glacial acetic acid, the solution is diluted with 180 ml. of water, and the mixture is extracted with benzene.

The several benzene extracts, before being further worked up, are thoroughly agitated with 200 ml. of acetic acid of 10% strength, and at the end of the operation the acetic acid phase is after-extracted with 200 ml. of benzene. The benzene extracts contain practically the whole of the alkaloids of the reserpine group and the bulk of the alkaloids of the ajmalicine group.

In order to isolate the alkaloids of the raunescine group the combined acetic acid alkaloid solutions, together amounting to about 3.3 liters, are extracted by thorough stirring or shaking in succession once with 1.5 liters and at least three times with one liter of ethylene chloride on each occasion. Each organic phase is again thoroughly shaken with 200 ml. of acetic acid of 10% strength and the latter is finally extracted with 200 ml. of ethylene chloride. The combined ethylene chloride extracts are neutralized with potassium carbonate solution, then dried over sodium sulfate and evaporated to dryness in vacuo. The resinous residue so obtained is split up by chromatography as follows:

6.42 grams of the extract are dissolved in a mixture of 8 parts by volume of benzene and 2 parts by volume of chloroform, the solution is transferred to a column of 250 grams of aluminum oxide (neutral, activity II–III according to Brockmann), and elutriation is carried out as follows:

| Quantity of eluate | Eluate mixture | Fraction |
|---|---|---|
| 1,000 ml | Benzene-chloroform 8:2 | I |
| 900 ml | Benzene-chloroform 8:2 | II |
| +500 ml | Benzene-chloroform 4:6 | |
| 500 ml | Benzene-chloroform 4:6 | III |
| 500 ml | Benzene-chloroform 4:6 | IV |
| +1,000 ml | Benzene-chloroform 2:8 | |

The course of the separation is advantageously followed by paper chromatography. The descending method is used with formamide-impregnated paper and there are obtained by using benzene or benzene-chloroform 1:1 as the developing phase the following $R_f$-values. In order to identify the alkaloids their characteristic fluorescence colors in ultraviolet light can be used.

| | Benzene | Benzene-chloroform | Fluorescence Color UV |
|---|---|---|---|
| Reserpiline | 0.69 | with the front | yellow. |
| Raunescine | 0.25 | 0.79 | grey brown. |
| Pseudoreserpine | 0.16 | 0.75 | green. |
| Isoraunescine | 0.15 | 0.53 | grey brown. |
| Raugustine | 0.13 | 0.48 | green. |

The alkaloids are isolated by crystallization from suitable solvents.

Fraction I: Contains reserpiline which is crystallized in the form of its oxalate.

Fraction II: Pseudoreserpine is crystallized from aqueous methanol or ethanol. The mother liquor contains a mixture of raunescine and pseudoreserpine, which can be separated from one another by chromatography.

Fraction III: Contains little material.

Fraction IV: Raugustine is crystallized from aqueous methanol or ethanol. The mother liquor contains a mixture of isoraunescine and raugustine, which can be separated from one another by chromatography. The raugustine so obtained has the physical characteristics mentioned in the opening part of this specification.

The acetic acid solution of the total alkaloids, which solution is freed from fats and other neutral substances and is used in the above fractional extraction, is obtained as follows:

4 kilograms of finely ground roots of *Rauwolfia ligustrina* R. and S. (*ternifolia*) are exhaustively extracted with methanol in a reflux extractor, and the solution is evaporated to dryness in vacuo. There are obtained 270 grams of a brown frothy mass. The latter is dissolved in 450 ml. of methanol and diluted in one portion with 3 liters of acetic acid of 10% strength.

Example 2

100 ml. of the acetic acid solution of the total alkaloids extracted with hexane and a mixture of hexane and ether (see Example 1) are extracted in succession once with 100 ml. and three to five times with 50 ml. of 1,1,1-trichlorethane with thorough stirring or shaking. Reextraction with 10 ml. of acetic acid of 10% strength and after-extraction of the acetic acid extracts with 10 ml. of 1,1-trichlorethane are carried out in the manner described in Example 1.

The acetic acid solution which remains behind is then extracted once with 100 ml. and three times with 50 ml. of ethylene chloride, and the resulting dry extract obtained therefrom is subjected to chromatography as described in Example 1. There are obtained from the fractions, as described in Example 1, reserpiline, raunescine, pseudoreserpine, isoraunescine and raugustine.

Example 3

100 ml. of a total alkaloid acetic acid solution extracted with hexane and a mixture of hexane and ether (see Example 1) are extracted in succession three times with 100 ml. and three to five times with 50 ml. of carbon tetrachloride. The further procedure is as described in Example 2. However, in order to ensure the complete removal of reserpine it is of advantage to carry out the extraction with carbon tetrachloride in a continuous manner. The carbon tetrachloride extract contains the alkaloids of the reserpine and ajmalicine groups. From the ethylene chloride extract there are obtained, as described in Example 1, in addition to reserpiline, pseudoreserpine, raunescine, raugustine and isoraunescine.

Example 4

100 ml. of a total alkaloid acetic acid solution extracted with hexane and a mixture of hexane and ether (see Example 1) are freed from the bases of the reserpine and ajmalicine groups by extraction with benzene as described in Example 1. The acetic acid solution of alkaloids remaining behind (100 ml.) is extracted once with 100 ml. and three times with 50 ml. of α:β-dichlorethyl ether. After chromatography and working up as described in Example 1, there are obtained from the extract reserpiline, pseudoreserpine, raunescine, raugustine and isoraunescine.

Example 5

150 grams of finely ground roots of *Rauwolfia canescens* are exhaustively extracted with methanol under reflux. There are obtained 18.2 grams of a dry extract which is dissolved in 45 ml. of methanol and diluted with 300 ml. of acetic acid of 10% strength as described in Example 1, and defatted first with 250 ml. of hexane and then twice with 150 ml. of a mixture of hexane and ether (1:1) on each occasion.

The acetic acid solution of total alkaloids so obtained (about 350 ml.) is extracted once with 200 ml. and three times with 150 ml. of benzene. Re-extraction of the benzene phases with 30 ml. of acetic acid of 10% strength and after-extraction of the acetic acid phase with 30 ml. of benzene are carried out in a manner described in Example 1. The combined benzene extracts contain, in addition to the alkaloids of the reserpine group, namely reserpine and deserpidine, the alkaloids of the ajmalicine group. The combined acetic acid solutions of the alkaloids are extracted twice with 150 ml. and 4 times with 100 ml. of ethylene chloride. The organic phases are subjected in succession to a re-extraction with 20 ml. of acetic acid of 10% strength and the latter to an after-extraction with 20 ml. of ethylene chloride. The combined ethylene chloride extracts are neutralized, dried and evaporated, as described in Example 1. The extract is chromatographed over 100 grams of aluminum oxide (neutral, activity II–III according to Brockmann) as follows:

| Quantity of eluate | Eluate mixture | Fraction |
|---|---|---|
| Total 500 ml | benzene<br>benzene-chloroform 9:1<br>benzene-chloroform 8:2<br>benzene-chloroform 7:3 | I |
| Total 600 ml | benzene-chloroform 6:4<br>benzene-chloroform 5:5<br>benzene-chloroform 4:6 | II |
| 200 ml | benzene-chloroform 3:7 | III |
| Total 500 ml | benzene-chloroform 2:8<br>benzene-chloroform 1:9 | IV |

This is substantially the same result as that obtained in Example 1, except that fraction I contains practically no material, since *Rauwolfia canescens* contains at most only traces of reserpiline.

Example 6

Raugustine can be converted into its ester with acetic acid as follows:

40 mg. of raugustine are dissolved in 2 ml. of pyridine and, after the addition of 1 ml. of acetic anhydride, the solution is allowed to stand at room temperature for 20 hours. The reaction mixture is then evaporated to dryness in vacuo. The residue is taken up in 20 ml. of chloroform and extracted twice with 5 ml. of dilute (2 N) sodium carbonate solution each time and twice with water. The chloroform solution is then dried with sodium sulfate and evaporated to dryness in vacuo. The red-brown residue crystallizes after the addition of benzene and a little hexane. The crystals are filtered with suction and, for the purpose of purification, dissolved in a mixture of equal part by volume of ether and clorofrom and filtered through a sintered glass filter covered with a layer of 1 gram of aluminum oxide (neutral, activity II–III, according to Brockmann). The solvent of the filtrate is then removed in vacuo. 18-O-acetyl-raugustine crystallizes after the addition of benzene and a little hexane in the form of colorless needles which, after repeated recrystallization from the same solvent, melt at 232–234° C. (with decomposition).

Example 7

Raugustine can be converted into its salt with nitric acid as follows:

20 mg. of raugustine are dissolved in 10 ml. of methylene chloride, the solution is filtered and then evaporated to dryness in vacuo. The residue is taken up in a little methanol (about 0.6 ml.), and a trace (on a glass rod) of pure, concentrated nitric acid is added. On rubbing with the glass rod crystallization occurs. After 5 minutes the mixture is filtered with suction and then washed first with a mixture consisting of equal parts by volume of methanol and ether, then with water. Raugustine nitrate has a melting point of 262–263° C. (with decomposition).

Example 8

150 grams of finely ground roots of *Rauwolfia mattfeldiana* Mgf. are exhaustively extracted with methanol under reflux. There are obtained 8.62 grams of a dry extract which is dissolved in 30 ml. of methanol and diluted with 200 ml. of acetic acid of 10% strength as described in Example 1, and defatted first with 200 ml. of hexane and then twice with 100 ml. of a mixture of hexane and ether (1:1) on each occasion.

The acetic acid solution of total alkaloids so obtained (about 250 ml.) is extracted once with 150 ml. and three times with 100 ml. of benzene. Re-extraction of the benzene phases with 25 ml. of acetic acid of 10% strength and after-extraction of the acetic acid phase with 25 ml. of benzene are carried out as described in Example 1. The combined benzene extracts contain, in addition to reserpine, the alkaloids of the ajmalicine group. The combined acetic acid solutions of the alkaloids are extracted twice with 100 ml. and 4 times with 80 ml. of ethylene chloride. The organic phases are combined two by two and subjected in succession to a re-extraction with 30 ml. of acetic acid of 10% strength each and the acetic acid phase to an after-extraction with 30 ml. of ethylene chloride. The combined ethylene chloride extracts are neutralized, dried and evaporated, as described in Example 1. The extract is chromatographed over 20 grams of aluminum oxide (neutral, activity II–III according to Brockmann) as follows:

| Quantity of eluate | Eluate mixture | Fraction |
|---|---|---|
| 130 ml | benzene-chloroform 8:2 | I |
| 85 ml | benzene-chloroform 4:6 | II |
| 42 ml | benzene-chloroform 4:6 | III |
| 85 ml | benzene-chloroform 2:8 | IV |
| 42 ml | chloroform | |

The fractions differ but little from those described in Example 1 for *Rauwolfia ligustrina* and contain the following alkaloids.

Fraction I: reserpiline
Fraction II: pseudoreserpine
Fraction III: little material (mixture of pseudoreserpine and raugustine)
Fraction IV: raugustine The alkaloids can be determined by paper chromatography and isolated by crystallization as described in Example 1.

Example 9

50 grams of finely ground root cortex of *Rauwolfia grandiflora* Mart., also called *R. affinis* Muell.-Arg., are exhaustively extracted under reflux with methanol. 7.74 grams of dry extract are obtained which, dissolved in 30 ml. of methanol as described in Example 1, are diluted with 200 ml. of acetic acid of 10% strength and defatted first with 200 ml. of hexane and then twice with 100 ml. of a mixture of hexane and ether (1:1) each time.

The resulting acetic acid total alkaloid solution (about 250 ml.) is extracted once with 150 ml. and three times with 100 ml. of benzene. Re-extraction of the benzene phases with 25 ml. of acetic acid of 10% strength and after-extraction of the acetic acid phase with 25 ml. of benzene are carried out as described in Example 1. The combined benzene extracts contain in addition to reserpine the alkaloids of the ajmalicine group. The combined acid alkaloid solutions are extracted twice with 100 ml. and four times with 80 ml. of ethylene chloride. The organic phases are combined two by two and subjected in succession to a re-extraction with 30 ml. of acetic acid of 10% strength each and the acetic acid phase to an after-extraction with 30 ml. of ethylene chloride. The combined ethylene chloride extracts are neutralized, dried and evaporated, as described in Example 1. There is obtained 0.96 gram of dry extract. 0.5 gram of the extract is chromatographed over 200 grams of aluminum oxide (neutral, activity II–III according to Brockmann) as follows:

| Quantity of eluate | Eluate mixture | Fraction |
|---|---|---|
| 95 ml | benzene-chloroform 8:2 | I |
| 60 ml | benzene-chloroform 8:2 | } II |
| 85 ml | benzene-chloroform 4:6 | |
| 42 ml | benzene-chloroform 4:6 | } III |
| 100 ml | benzene-chloroform 2:8 | } IV |
| 42 ml | chloroform | |

The fractions differ but little from those described in Example 1 for *Rauwolfia ligustrina* and contain the following alkaloids.

Fraction I: reserpiline
Fraction II: pseudoreserpine (a little raunescine)
Fraction III: little material (mixture of pseudoreserpine and raugustine)
Fraction IV: raugustine The alkaloids can be determined by paper chromatography and isolated by crystallization as described in Example 1.

What is claimed is:
1. A process for extracting alkaloids of the raunescine group having the formula

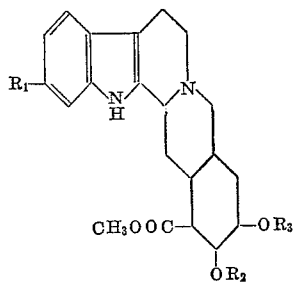

in which $R_1$ stands for a member selected from the group consisting of hydrogen and methoxy, one of the substituents $R_2$ and $R_3$ stands for hydrogen and the other for 3,4,5-trimethoxybenzoyl, from an aqueous solution of a weak acid selected from the group consisting of a weak carboxylic acid and a weak inorganic acid, containing said alkaloids of the raunescine group in admixture with other weakly basic alkaloids of Rauwolfia plants, which comprises extracting said aqueous solution with a member of the group consisting of benzene, lower alkyl substituted benzenes and chlorinated lower alkanes, separating the aqueous solution from the organic layer and extracting the aqueous solution with a member selected from the group consisting of ethylene chloride and 1:2-dichloro-1-ethoxy-ethane.

2. The process of claim 1, wherein the aqueous solution of a weak acid is an aqueous acetic acid solution.

3. A process for extracting alkaloids of the raunescine group having the formula

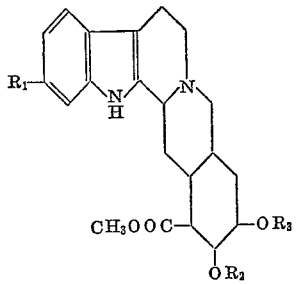

in which $R_1$ stands for a member selected from the group consisting of hydrogen and methoxy, one of the substituents $R_2$ and $R_3$ stands for hydrogen and the other for 3,4,5-trimethoxybenzoyl, from an aqueous solution of an alcoholic extract of a Rauwolfia plant, said aqueous solution being one of a weak acid selected from the group consisting of a weak carboxylic acid and a weak inorganic acid, containing said alkaloids of the raunescine group in admixture with other weakly basic alkaloids of Rauwolfia plants, which comprises extracting said aqueous solution with a member of the group consisting of benzene, lower alkyl substituted benzenes and chlorinated lower alkanes, separating the aqueous solution from the organic layer and extracting the aqueous solution with a member selected from the group consisting of ethylene chloride and 1:2-dichloro-1-ethoxy-ethane.

4. A member selected from the group consisting of crystalline 11-methoxy-isoraunescine, an unsubstituted lower alkanoic acid ester thereof and an acid addition salt thereof.

5. 11-Methoxy-isoraunescine nitrate.
6. 18-O-acetyl-11-methoxy-isoraunescine.

References Cited in the file of this patent
FOREIGN PATENTS
734,108    Great Britain _____ July 27, 1955

OTHER REFERENCES
Ulshafer, Jour. Org. Chem., vol. 21, 1956, p. 923.
Klohs et al., JACS, 1957, vol. 79, pp. 3763–3766.
Van Lamelen et al., JACS, 1957, vol. 79, pp. 5256–5262.